United States Patent [19]
Kennard et al.

[11] Patent Number: 6,107,986
[45] Date of Patent: *Aug. 22, 2000

[54] DISPLAY

[75] Inventors: Adrian Kennard, Bracknell, United Kingdom; Juhani Miettunen; Mikko Palatsi, both of Oulu, Finland

[73] Assignee: Nokia Mobile Phones Limited, Espoo, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 08/433,681

[22] Filed: May 4, 1995

Related U.S. Application Data

[63] Continuation of application No. 08/119,028, Sep. 9, 1993, abandoned.

[30]     Foreign Application Priority Data

Sep. 10, 1992 [GB] United Kingdom .................. 9219157

[51] Int. Cl.⁷ ..................................................... G09G 3/00
[52] U.S. Cl. ............................. 345/141; 345/127; 345/46; 345/50; 340/815.4; 455/566; 379/93.18
[58] Field of Search ...................... 345/145, 127, 345/128, 38, 39, 33, 34, 41, 43, 44, 47, 46, 48, 49, 50, 56, 141, 59, 160, 157; 463/37; 379/433, 93.17–93.19, 92.23, 100.01; 455/566, 575, 90; 340/815.4, 815.44

[56]               References Cited

U.S. PATENT DOCUMENTS

| | | | |
|---|---|---|---|
| 3,829,841 | 8/1974 | Steinberg | 364/221 |
| 3,979,178 | 9/1976 | Umeda et al. | 345/145 |
| 4,087,808 | 5/1978 | Herndon, Jr. | 345/128 |
| 4,465,999 | 8/1984 | Tsuzuki et al. | 340/784 |
| 4,646,081 | 2/1987 | Tsunoda | 345/56 |
| 4,651,299 | 3/1987 | Miyazaki et al. | 345/418 |
| 4,782,339 | 11/1988 | Zeising et al. | 435/56 |
| 4,920,337 | 4/1990 | Kuo | 345/115 |
| 5,067,150 | 11/1991 | Satomi et al. | 379/354 |
| 5,146,212 | 9/1992 | Venolia | 345/145 |
| 5,227,772 | 7/1993 | Takebe | 345/141 |
| 5,627,948 | 5/1997 | Fukunaga | 345/145 |
| 5,664,210 | 9/1997 | Fleming et al. | 345/145 |

FOREIGN PATENT DOCUMENTS

| | | | |
|---|---|---|---|
| 3007795 | 9/1980 | Germany . | |
| 1243795 | 2/1989 | Japan . | |
| 1263693 | 10/1989 | Japan | 345/145 |
| 519735 | 1/1993 | Japan | 345/145 |
| 5273953 | 10/1993 | Japan | 345/145 |
| 2062908 | 5/1981 | United Kingdom . | |
| 2128006 | 4/1984 | United Kingdom . | |

OTHER PUBLICATIONS

"The Waite Group's Windows API bible" Conger pp. 179–181, Mar. 1992.
Conger, James "The Waite Group's Windows API Bible: The Definitive Programmer's Reference", Waite Group Press 1992 pp. 179–181.
"Multiplexing Makes Liquid–Crystal Displays Alphanumeric", Electronic Design, vol. 29, No. 19, pp. 177–184, Sep., 1981.

*Primary Examiner*—Lun-Yi Lao
*Attorney, Agent, or Firm*—Perman & Green, LLP

[57]                  ABSTRACT

A display 10 for an electronic apparatus e.g. a portable radio telephone comprises a two row by eight column array of character display elements 12 for displaying characters 13. The character display elements 12 in the first seven columns comprise a conventional LCD 7×5 pixel matrix with the character display elements 16 of the last column comprising a single column of pixels. Data input into the electronic apparatus is shown on the display 10 as it is input with the next character display element 12,16 to be filled being indicated by a vertical cursor 21. When the top row 26 of the display 10 is full i.e. when the conventional character display elements 12 are all used up, the vertical cursor 21 is still displayed in the additional, single column, character display element 16. This extra character display element 16 adds very little length to the display but allows text editors to act in a more logical way.

14 Claims, 4 Drawing Sheets

// DISPLAY

This is a continuation of application Ser. No. 08/119,028 filed on Sep. 9, 1993, now abandoned.

FIELD OF THE INVENTION

This invention relates to a display, in particular, although not exclusively, for an electronic apparatus e.g. a portable radio telephone.

BACKGROUND OF THE INVENTION

The provision of a display on an electronic apparatus is well known, for example, on portable radio telephones and calculators.

The displays are used, typically, to indicate to the user, using alphanumeric characters or other suitable indicators, for example, the status of the electronic apparatus, or information being input into the electronic apparatus, via, for example, a keyboard.

FIGS. 1A and 1B illustrates a typical display used on a portable radio telephone.

A display 1 typically comprises an array of character display elements 2, each display element 2 being arranged to display a single alphanumeric character 3 or other character. As illustrated, the array comprises 2 rows by 8 columns i.e. a 2×8 matrix of character display elements. The display 1 is commonly a liquid crystal display (LCD) although other display types could be used, for example, using light emitting diodes (LED's).

In the present context, the term "character" will be used to mean any alphanumeric character, indicator, sign, symbol or the like capable of being displayed on the display 1, and the term "word" will be used to define one or more characters grouped together without a gap there between e.g. a telephone number, a persons name, or an abbreviation used to indicate status.

Each character display element 2 comprises a smaller array 4, or matrix, of picture elements 5 (commonly referred to as pixels). Typically, a character display element comprises a pixel matrix of 7×5 pixels i.e. a matrix of 7 rows of pixels by 5 columns of pixels.

Each pixel can be made to appear either dark or light using well known techniques, so that, by selecting the appropriate pixels 5 in each matrix of each character display element 2 to appear dark, while leaving the others light, allows a character to be displayed in that character display element 2. This is shown clearly in FIG. 1B, which shows how the number "5" can be displayed.

When inputting information into an electronic apparatus, e.g. a portable telephone, the information may be displayed on such a display 1. An example of this is, for example, when a telephone number is input, either for storage or for dialing, in a portable telephone. As each digit is keyed in via the telephone's keyboard, they appear successively in adjacent character display elements starting, for example, from the first character display element i.e. from the left hand side as seen in FIG. 2A, with the next unfilled character display element which is to be filled being indicated by a horizontal cursor 6.

The horizontal cursor 6, can also be made to move along the display 1 to identify a particular character which the user wishes to change e.g. for text editing.

Very often a word, for example, a telephone number, will not totally fit onto the same row. In this case, a technique known as word-wrapping is used whereby, when a word is unfinished when one line is full, the full word is "wrapped" onto the next line, so that the whole word appears on the next line.

This is done so that words do not appear disjointed and are, therefore, easier to read. An example would be where the name "JOE SMITH" is input and displayed. The top row of the display would display "JOE SMI". When the user inputs the next character i.e. "T", rather than this character appearing in the first display element of the next row on its own, the whole of the word input so far i.e. "SMIT" would be "wrapped" on the next line i.e. to appear on the next line.

The display of the characters on the display 1 and the control of the word wrapping is carried out under control of logic within the electronic apparatus e.g. using a microprocessor. The logic is operable to recognize when a row of the display is full and to "wrap" the word input before the end of the row is reached, onto the next row if the word is unfinished when all the display elements on that row are filled. When a word is longer than the length of a display, word wrapping cannot be used and in order to display it, the word is split in two i.e. the word simply continues on the next line. Using a display of eight-columns, a nine character word e.g. the telephone number "012345678" would have "01234567" on the first row with the "8" on the second row. The logic also recognizes when a space is input after a row has been filled i.e. that a finished word coincides with the end of a row of the display and controls the display of the characters so that the first character of the next word is displayed in the first display element of the next row. When the end of a word coincides with the end of a row, the cursor disappears from the right-hand end of the display (because there are no more display elements left). So for example, for an eight-character telephone number "01234567" would fill the first row of the display as shown in FIGS. 2A and 2B, with one character for each character display element 2, with the horizontal cursor 6 indicating the next display element to be filled. When all the characters have been input, as illustrated in FIG. 2B, the cursor 6 disappears from the display 1 and the top row of the display is full.

The user then inputs a space and the next new word, which, as discussed above begins at the beginning of the next row. As an example, let us say that the next word comprises the single character "8". This is shown as an "8" in the first display element of the next row. To the user, this appears identical to the nine-character word "012345678". It is a problem, therefore, that during inputting or editing of information it can sometimes be difficult for the user to distinguish whether one long word or two separate words have been input and is being displayed, which can be confusing.

SUMMARY OF THE INVENTION

According to the present invention, there is provided a display for displaying at least one word comprising one or more characters thereon, the display comprising an array of similarly sized character display elements, each display element being arranged to display a single character therein, and at least one differently-sized character display element adjacent the array for displaying a character therein.

This has the advantage that the display displays words in a more readable way and allows text editing to be carried out in a more logical way which is more convenient for and understandable by the user, and which, at the same time, adds very little length to the display.

DETAILED DESCRIPTION OF EMBODIMENTS OF THE INVENTION

Figure 1A:
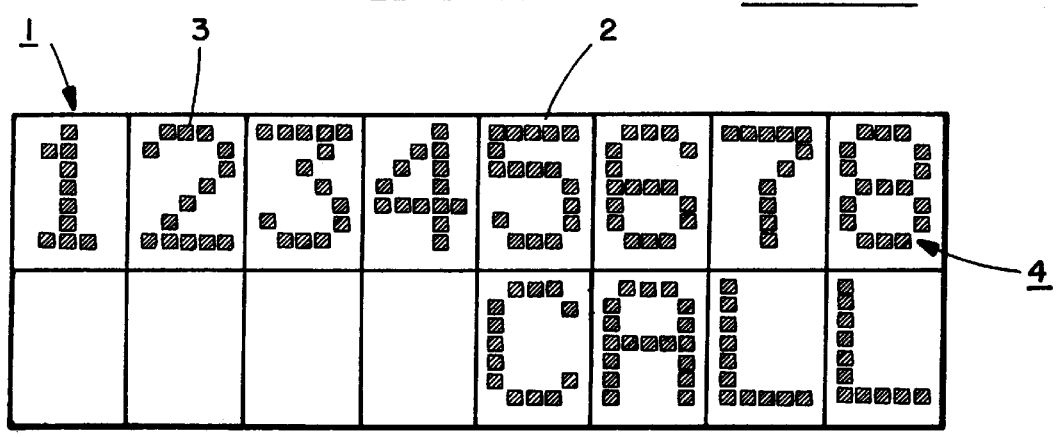
FIG. 1A illustrates a display of the prior art for a radio telephone.
Figure 1B:
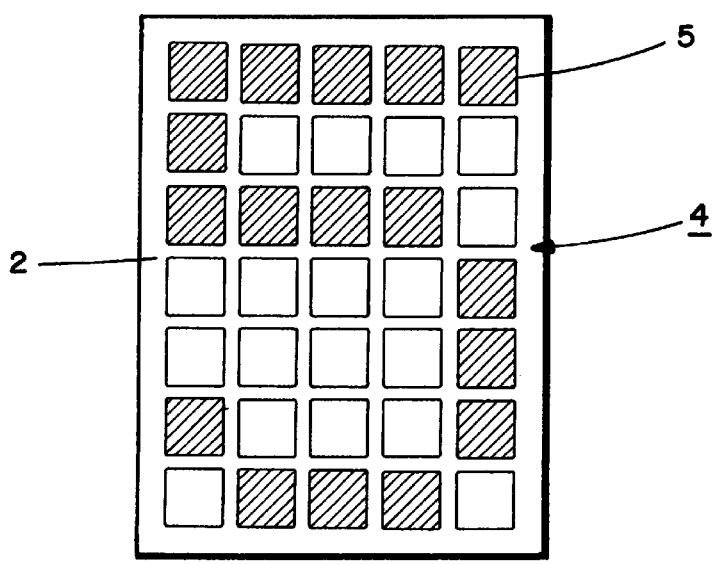
FIG. 1B illustrates a character display element of the display of FIG. 1A.
Figure 2A:
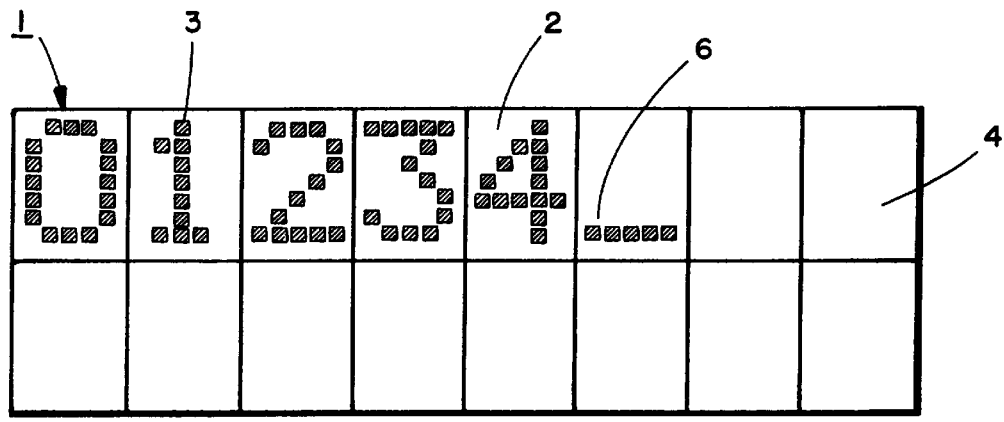
FIGS. 2A and 2B illustrate the display of a word on the display of FIG. 1.
Figure 2B:
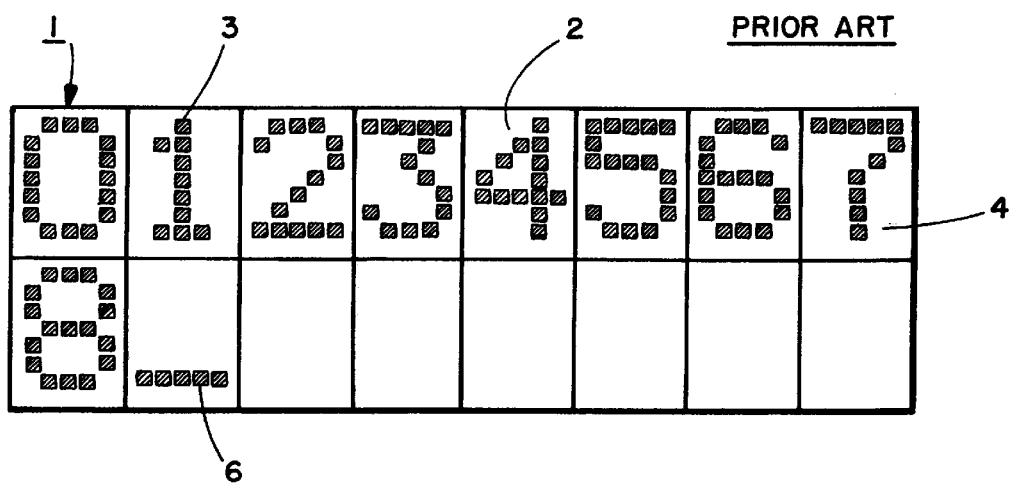

Embodiments of the invention will now be described, by way of example only, with reference to the accompanying drawings.

The display 10 in accordance with the invention comprises, as with the display 1 of the prior art, an array of character display elements 12. In the embodiment described here, the display 10 comprises an array of 8 columns by 2 rows of character display elements 12. Again as in the prior art, the display 10 is an LCD whereby each character display element 12 comprises a 7×5 pixel array 14 in which each pixel 15 in the array can be made to appear light or dark and thus able to form the required character 13. The way in which the pixels 15 are made to appear light and dark, and the way in which the appropriate characters 13 are formed is well known to persons skilled in the art and is therefore not described herein in detail.

Unlike the display 1 of the prior art however, the display 10 in accordance with the invention is extended in length by one column of pixels i.e. it has extra additional character display elements 16, one at the end of each row 26,22 which is smaller than the conventional character display element 12 and comprises a pixel array 11 of 7 rows by 1 column. In the embodiment described herein, this additional character display element 16 is provided at the right hand end of the display 10.

When incorporated on an electronic apparatus, for example, a portable radio telephone, the display 10 is coupled to and controlled by a microprocessor 17, which may also be used to control all the basic functions of the telephone, and a keypad 18 in a known manner. The keypad 18 is used for dialing telephone numbers and, for example, for entering alphanumeric data, for example a person's name and his telephone number into a telephone number store 19. The display 10 is also controlled to provide word-wrapping as discussed above in relation to the prior art.

Figure 3:
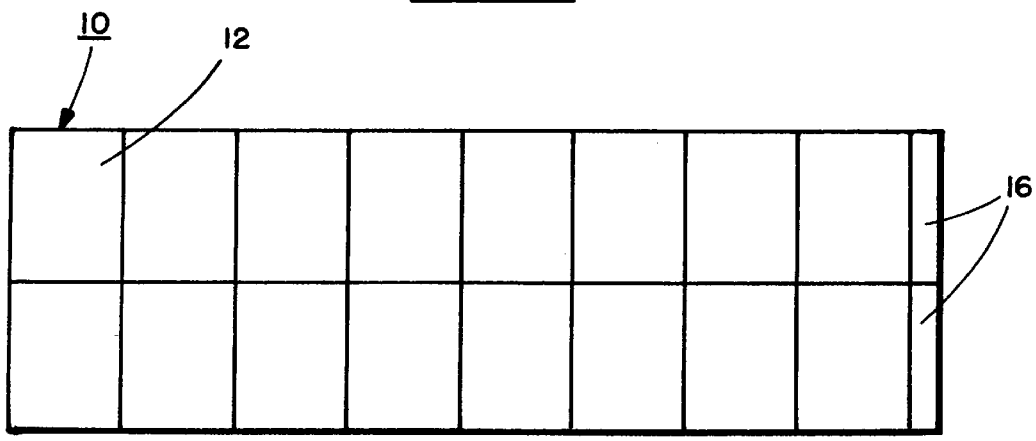
FIG. 3 illustrates a portion of a display in accordance with the invention.
Figure 4:
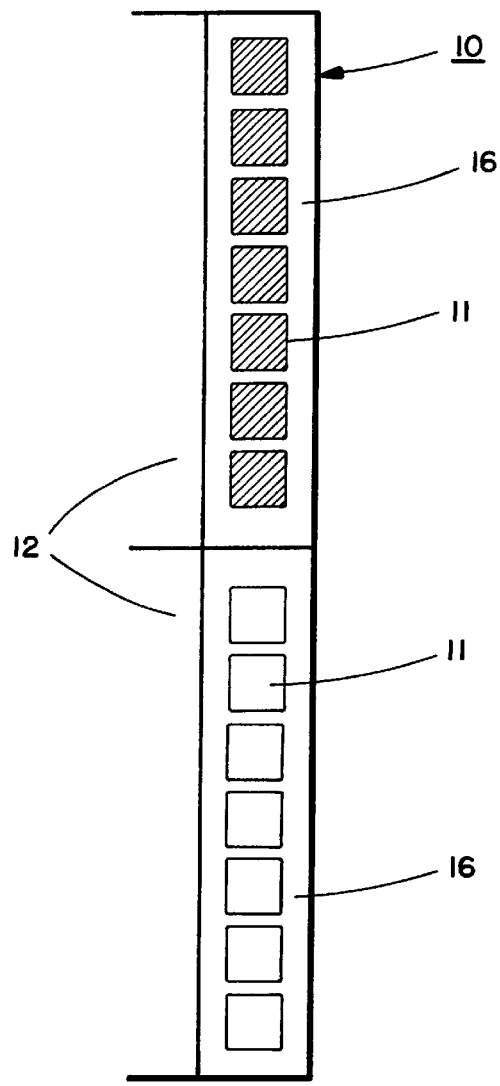
FIG. 4 illustrates in greater detail an end portion of the display of FIG. 3.
Figure 5:
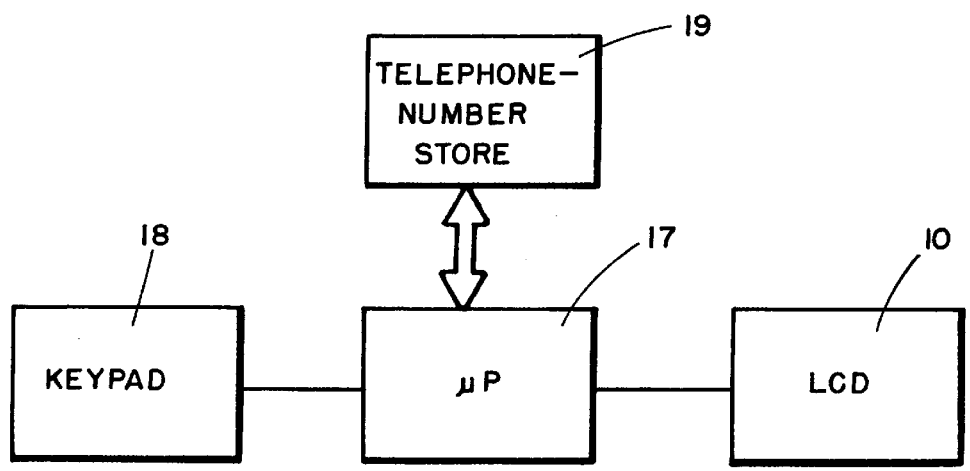
FIG. 5 is a block diagram illustrating the incorporation of a display in a portable radio telephone.

As in the prior art, when a user inputs information e.g. a person's name to be stored in the telephone number store 19, each character 13 is displayed in respective character display elements 12 of the display 10 starting at the top row 26, consecutive characters being placed in adjacent character display elements 12. In the embodiment described here, the characters 13 fill up from left to right as seen in FIG. 3.

As in the prior art a cursor 21 is used to indicate the next adjacent character display element 12 to be filled. However, in this case, the cursor is a vertical cursor formed by selectively lightening or darkening the left hand column of pixels of the conventional character display element 12.

Figure 6A:
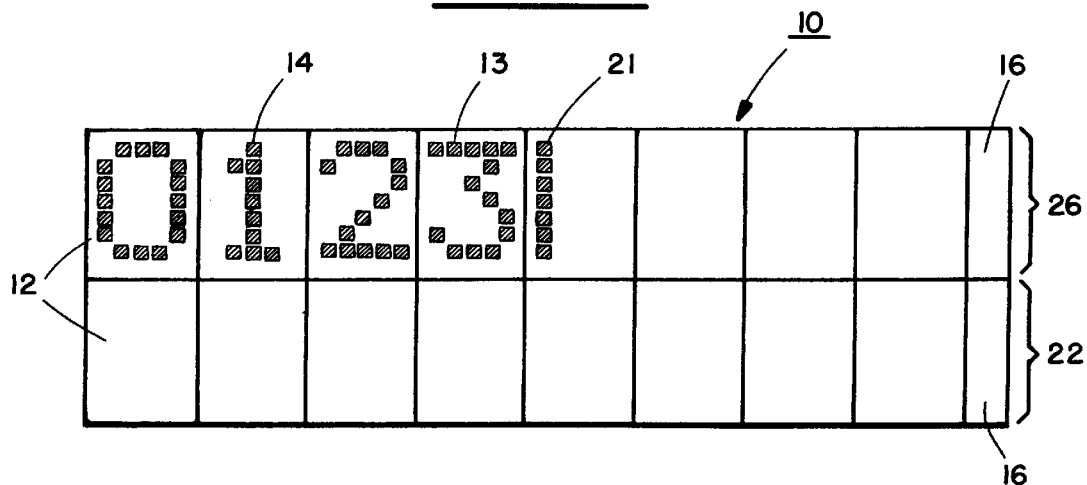
FIGS. 6A and 6B illustrate the display of a word on the display of FIG. 3.
Figure 6B:
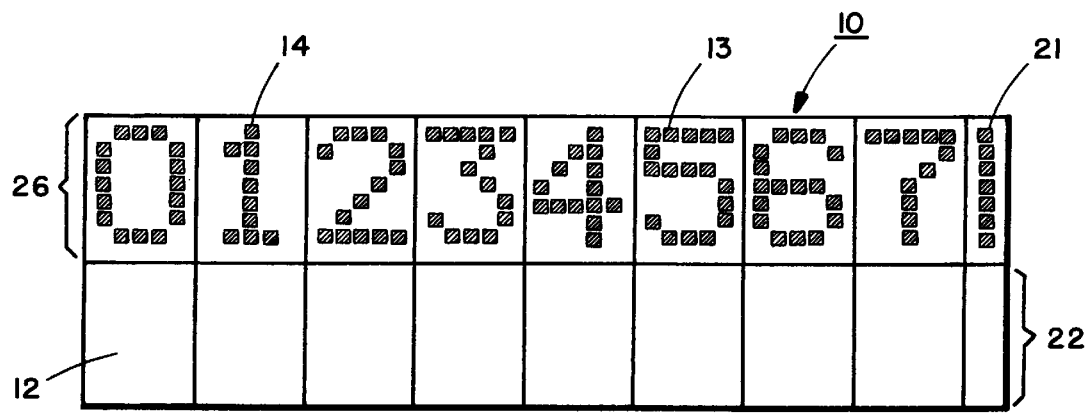

FIGS. 6A and 6B show how an eight character word e.g. "01234567" is displayed. As each character 13 is input, the character 13 is displayed in respective adjacent character display elements 12 starting from the left-hand side of the display 10 as seen in FIGS. 6A and 6B, with the next character display element 12 to be filled being indicated by a vertical cursor 21.

As the display 10 fills up the cursor 21 moves along from left to right.

The display 10 of the characters 13 and the cursor 21 on the display 10 is controlled in a known manner using the microprocessor 17.

When the whole word "01234567" has been entered, because the display 10 has the additional character display element 16, the vertical cursor 21 is still displayed, i.e. at the end of the top row 26, rather than disappearing off the display.

The additional character display element 16 is only used to display the vertical cursor 21, or a space, but no other character. In effect, the additional display element 16 is a "virtual" display element which is used to display the vertical cursor 21. If the user wishes to then enter a new word e.g. "8" after "01234567", he inputs a space, the vertical cursor 21 moves to the first display element 12 of the next row 22. The user then inputs the character "8", which is displayed, and the vertical cursor 21 then moves to the adjacent display element 12. If text editing is available and the user wishes to edit i.e. change what he has input, he can move the cursor to the appropriate display element 12,16, and at all times the cursor 21 can be seen by the user.

Figure 7:
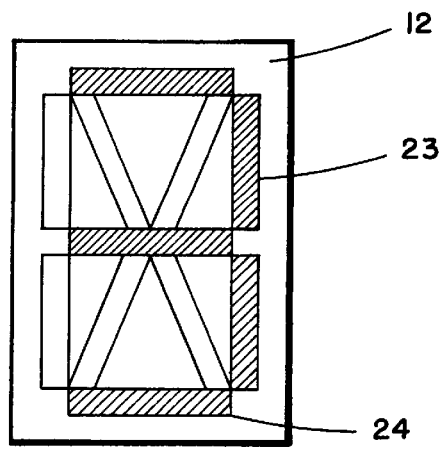
FIG. 7 illustrates an alternative embodiment of the display of FIG. 3.

Rather than a pixel matrix, each character display element 12 can use a multi-segment display 23 to display the required character, as illustrated in FIG. 7. In this case, each character display element 12 has a multi-segment display 23. Each segment 24 can be made to appear light or dark, so that by selecting each segment to have the appropriate light or dark appearance, the appropriate character can be displayed in this case the number "3". This is also of the LCD type and is controlled in the same manner as the pixel matrix.

It will be evident from the foregoing description that various modifications are possible within the scope of the present invention. For example, LEDs or other display devices can be used instead of LCD's.

What we claim is:

1. A display for displaying at least one word comprising one or more characters thereon, the display comprising:

an array of first similarly-sized fixed character display elements, each display element being arranged to display a single character therein; and at least one second differently sized fixed character display element adjacent a lateral side of the array for displaying only a single character therein at any one time, wherein said at least one second differently sized character display element is arranged to display a vertical cursor.

2. A display as set forth in claim 1 wherein said array comprises a matrix of at least two rows of similarly-sized character display elements, with individual ones of the second differently sized fixed character display elements being provided adjacent each row of said matrix respectively.

3. A display as set forth in claim 1 wherein each of the second differently sized fixed character display elements comprises a vertical column of pixels, each pixel being switchable between a light and dark appearance such that by selecting an appropriate light or dark appearance for each of said pixels said vertical cursor is displayed.

4. A display as set forth in claim 1 wherein each of the second differently sized fixed character display elements comprises at least one vertical segment switchable between a light and dark appearance such that by selecting an appropriate light or dark appearance for each segment said vertical cursor is displayed.

5. A display as set forth in claim 1 wherein said at least one second differently sized fixed character display element is smaller than said first similarly-sized display elements.

6. A display as set forth in claim 5 wherein said at least one second differently sized fixed character display element is narrower than said first similarly-sized display elements.

7. A display as set forth in claim 1, wherein said display is a liquid crystal display.

8. A display as set forth in claim 1 wherein said display is a light emitting diode display.

9. An electronic apparatus having a display as set forth in claim 1.

10. A display comprising:

an array of rows of first character display elements, each first character display element having a first type of array of picture elements for selectively displaying individual characters in each first character display element; and a second character display element located at a lateral side of an end of one of the rows, the second character display element being different from the first character display elements and having a different second type of array of picture elements adapted to display only a vertical cursor at any one time.

11. A display as in claim 10 wherein the first character display elements are fixed single character display elements.

12. A display as in claim 10 wherein the second character display element is a fixed single character display element.

13. A display as in claim 12 wherein the first character display elements are fixed single character display elements.

14. A display for displaying at least one word comprising one or more characters thereon, the display comprising:

an array of first similarly-sized fixed character display elements, each display element being arranged to display a single character therein; and at least one second differently sized fixed character display element adjacent a lateral side of the array for displaying only a single character therein at any one time, wherein said at least one second differently sized character display element is arranged to display a vertical cursor, wherein said at least one second differently sized fixed character display element is narrower than individual ones of said similarly-sized display elements.

\* \* \* \* \*